United States Patent
Jheng

(10) Patent No.: US 12,490,873 B2
(45) Date of Patent: Dec. 9, 2025

(54) BLOWER OF HAND DRYER

(71) Applicant: HOKWANG INDUSTRIES CO., LTD., New Taipei (TW)

(72) Inventor: Cing-Fong Jheng, New Taipei (TW)

(73) Assignee: HOKWANG INDUSTRIES CO., LTD., New Taipei (TW)

( * ) Notice: Subject to any disclaimer, the term of this patent is extended or adjusted under 35 U.S.C. 154(b) by 594 days.

(21) Appl. No.: 18/082,021

(22) Filed: Dec. 15, 2022

(65) Prior Publication Data

US 2024/0197122 A1   Jun. 20, 2024

(51) Int. Cl.
| | |
|---|---|
| A47K 10/48 | (2006.01) |
| F04D 29/28 | (2006.01) |
| F04D 29/42 | (2006.01) |
| F26B 19/00 | (2006.01) |
| F26B 21/00 | (2006.01) |

(52) U.S. Cl.
CPC .................... *A47K 10/48* (2013.01)

(58) Field of Classification Search
CPC ..... A47K 10/48; F04D 29/4253; F26B 2/001; F26B 19/00
See application file for complete search history.

(56) References Cited

U.S. PATENT DOCUMENTS

| | | | | |
|---|---|---|---|---|
| 6,558,640 B1 * | 5/2003 | Nottingham | ............ | A61L 2/06 |
| | | | | 219/400 |
| 2012/0246963 A1 * | 10/2012 | Fisher | .................. | A47K 10/48 |
| | | | | 137/597 |

FOREIGN PATENT DOCUMENTS

| | | | | | |
|---|---|---|---|---|---|
| CN | 203693460 U | * | 7/2014 | ............ | A47K 10/48 |
| JP | 4293271 B2 | | 7/2009 | | |
| KR | 20100108772 A | * | 10/2010 | ............ | A47K 10/48 |

OTHER PUBLICATIONS

English translation of KR20100108772 by PE2E Aug. 18, 2025.*
English translation of CN203693460 by PE2E Aug. 18, 2025.*

* cited by examiner

Primary Examiner — Deming Wan
(74) Attorney, Agent, or Firm — MUNCY, GEISSLER, OLDS & LOWE, P.C.

(57) ABSTRACT

A blower of a hand dryer includes an air flow generation module and a blower housing. The air flow generation module includes an air case, an electric motor and a control circuit board The air case includes an air inlet and an air outlet gap. The blower housing is provided with the air flow generation module. The blower housing includes a first half shell and a second half shell. The second half shell includes a first sub-shell and a second sub-shell capable of being separated from the first sub-shell. The first sub-shell includes an opening. The opening is provided for installing the air flow generation module and exposing the control circuit board outside of the first sub-shell, the second sub-shell is mounted on the opening, and when the second sub-shell is separated from the first sub-shell, the control circuit board is being exposed.

12 Claims, 7 Drawing Sheets

BLOWER OF HAND DRYER

FIELD OF THE INVENTION

The invention relates to a blower of a hand dryer, and more particularly, to a blower of a hand dryer including a shell capable of being separated.

BACKGROUND OF THE INVENTION

In conventional hand dryer structures, in order to stably assemble an electric motor for generating an air flow, the electric motor is structurally supported by a plurality of housings and is given a corresponding function. For example, Japan Patent No. JP 4293271 B2 discloses a hand dryer comprising a main body housing and a fan motor, wherein the main body housing comprises a rear housing, a front housing, a fan motor supporting shell provided in the main body housing, and a fan motor front housing, wherein the fan motor supporting shell is fixed on the rear housing and supports the fan motor, and the fan motor front housing is assembled with the fan motor supporting housing. The fan motor is further disposed within the fan motor front housing and the fan motor supporting shell.

In addition, a control circuit board of the conventional hand dryer structure is separated from the electric motor, and a plurality of housings entirely cover the electric motor, the control circuit board and other internal components. However, the above-mentioned Japan Patent No. JP 4293271 B2 does not have a design for the relationship between the control circuit board and the housings, and thus, once the control circuit board has to be replaced, whole of the main body housing must be disassembled to take out the control circuit board, and whole of the main body housing is reassembled after the replacement is completed, greatly increasing the disassembly and assembly processes.

SUMMARY OF THE INVENTION

The main object of the invention is to solve the problem that control circuit board and housing of conventional structures are not designed for control circuit board replacement.

In order to achieve the above-mentioned object, the invention provides a blower of a hand dryer, including an air flow generation module and a blower housing. The air flow generation module is an integrated structure. The air flow generation module includes an air case, an electric motor and a control circuit board. The air case, the electric motor and the control circuit board are sequentially arranged along an extension line. The air case includes an air inlet located on the extension line and an air outlet gap defined by the electric motor and the air case. The blower housing includes a first half shell, a second half shell assembled with the first half shell, and an air guiding cover assembled with the first half shell and the second half shell. The air flow generation module is provided in the first half shell and the second half shell. The first half shell includes an air intake facing the air inlet. The second half shell includes a first sub-shell assembled with the first half shell and a second sub-shell capable of being separated with the first sub-shell. The first sub-shell forms a ventilation space communicating the air outlet gap with the air guiding cover. The first sub-shell includes an opening. The opening is provided for installing the air flow generation module therethrough and exposing the control circuit board outside of the first sub-shell. The second sub-shell is mounted on the opening. The control circuit board is exposed and replaceable when the second sub-shell is separated with the first sub-shell.

In an embodiment, the first half shell includes an air filter mounting frame, and whole of the air intake is located in the air filter mounting frame.

In an embodiment, the air filter mounting frame is a component separable from the first half shell, the first half shell includes a plurality of coupling posts facing the air filter mounting frame, the air filter mounting frame includes a plurality of coupling structures assembled with the plurality of coupling posts, each of the plurality of coupling structures is selected from a group consisting of a hole, a connecting piece and a protruding post.

In an embodiment, one end of the electric motor is connected to the opening.

In an embodiment, the blower housing includes a first collar disposed inside the first half shell and sleeved outside the air case.

In an embodiment, the blower housing includes a second collar disposed inside the first sub-shell and sleeved outside the electric motor.

In an embodiment, the first sub-shell includes a plurality of coupling blocks arranged along the opening, and the second sub-shell includes a plurality of coupling lugs arranged at a periphery and assembled with the plurality of coupling blocks.

In an embodiment, the first half shell includes a receiving portion in which the air case is provided and an air guiding portion communicating with the ventilation space, and the receiving portion tangentially extends to form the air guiding portion.

In an embodiment, the first sub-shell includes a restriction rib provided in the ventilation space.

In an embodiment, the air guiding cover includes a connection base and an air outlet portion, the connection base connects the first half shell and the second half shell, the air outlet portion extends from one end of the connection base, and an outer surface of the connection base opposite to the first half shell and the second half shell is an operating circuit board mounting surface.

According to the foregoing embodiment of the invention, the following features are provided in comparison with the conventional technology. In the invention, the first sub-shell is provided for installing the air flow generation module therethrough and exposing the control circuit board outside of the first sub-shell, the control circuit board mounted at the opening is replaceable through separating the second sub-shell, and when the second sub-shell is separated from the first sub-shell, the control circuit board will be exposed for replacement without needing to change to other components of the blower of a hand dryer, so as to solve the problem of a cumbersome replacing process of the control circuit board in a conventional blower of a hand dryer.

DETAILED DESCRIPTION OF THE PREFERRED EMBODIMENTS

Figure 1:
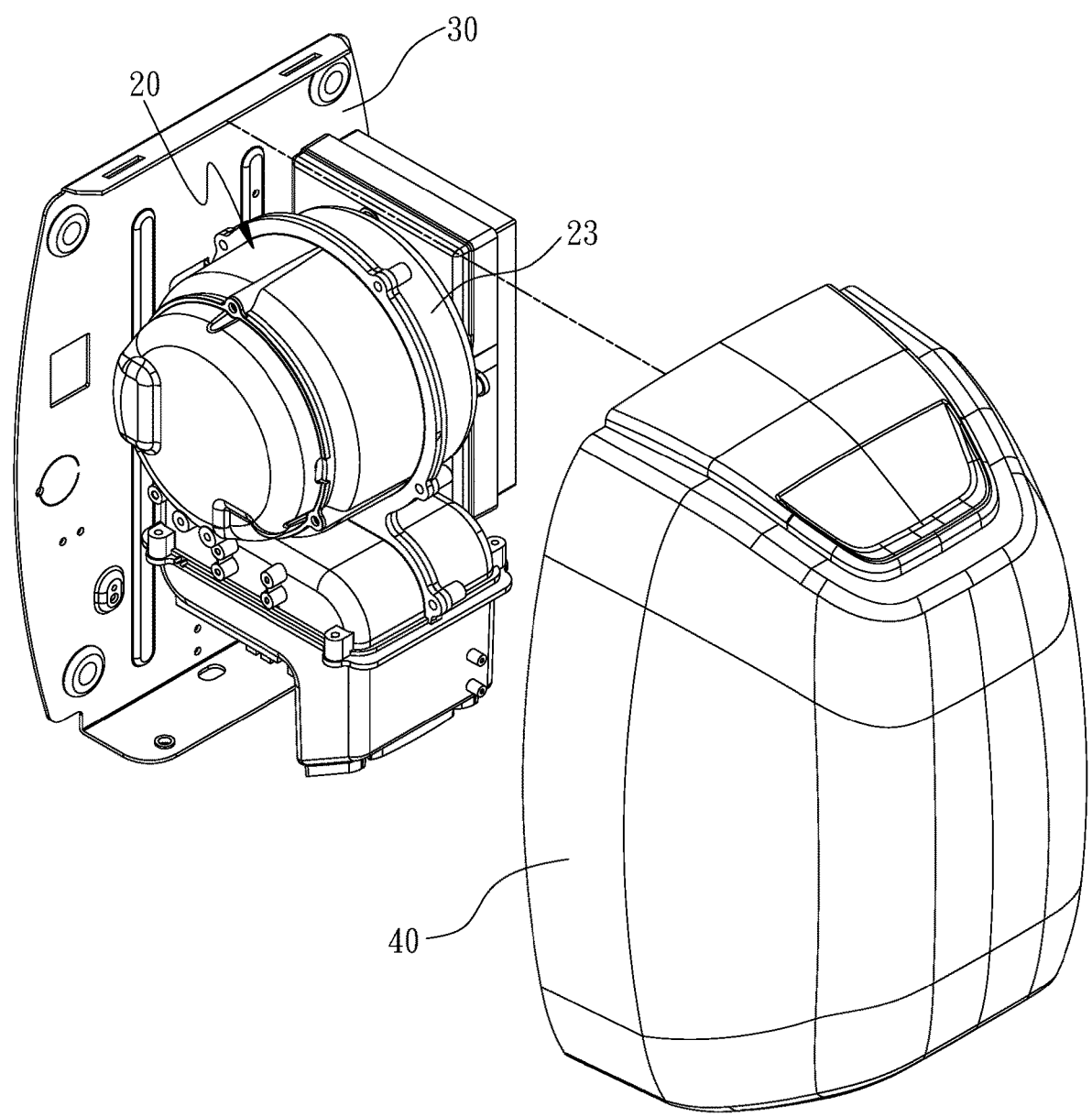
FIG. 1 is a schematic diagram of an embodiment of a blower of the invention assembled in a hand dryer.

The detailed description and technical contents of the invention are described as follows with reference to the drawings.

As used hereinafter, the terms "first" and "second" of elements are intended to distinguish one element from another and are not intended to limit the order of the elements.

With reference to FIG. 1, FIG. 2, FIG. 3, FIG. 4, and FIG. 5, the invention provides a blower 20 of a hand dryer, which is applied as in part of a hand dryer 50. In addition to including the blower 20 of a hand dryer, the hand dryer 50 further includes a hand dryer base plate and a hand dryer cover 40. The blower 20 of a hand dryer includes an air flow generation module 21 and a blower housing 23. The air flow generation module 21 is provided in the blower housing 23. The air flow generation module 21 is an integrated structure. The air flow generation module 21 includes an air case 211, an electric motor 212 and a control circuit board 213. The air case 211, the electric motor 212 and the control circuit board 213 are sequentially arranged along an extension line 214. In detail, the air flow generation module 21 is of a stacked design. In one embodiment, an axis of the electric motor 212 is defined as the extension line 214 of the air flow generation module 21. The air case 211 and the control circuit board 213 are respectively arranged at both ends of the electric motor 212 along the extension line 214. The air case 211 includes an air inlet 215 located on the extension line 214 and an air outlet gap 216 defined by the air case 211 and the electric motor 212. The air inlet 215 is formed at a side, opposite to the electric motor 212, of the air case 211. The air outlet gap 216 is located at a side, facing the electric motor 212, of the air case 211.

Moreover, the blower housing 23 includes a first half shell 231, a second half shell 232 and an air guiding cover 233. The first half shell 231 is assembled with the second half shell 232. The air flow generation module 21 is provided in the first half shell 231 and the second half shell 232. The air guiding cover 233 is assembled with the first half shell 231 and the second half shell 232. The first half shell 231 includes an air intake 234 formed at a side, away from the second half shell 232, of the first half shell 231. The second half shell 232 includes a first sub-shell 235 and a second sub-shell 236. The first sub-shell 235 is assembled with the first half shell 231 and the air guiding cover 233. The first sub-shell 235 is formed with a ventilation space 237 and an opening 238. In detail, the first sub-shell 235 has a space larger than size of the electric motor 212, and the space communicates the air outlet gap 216 and the air guiding cover 233 and is defined herein as the ventilation space 237. The opening 238 is formed on a side, opposite to the first half shell 231, of the first sub-shell 235. The second sub-shell 236 is provided on the opening 238 and connected to the first sub-shell 235. In one embodiment, the first sub-shell 235 includes a plurality of coupling blocks 241, and the second sub-shell 236 includes a plurality of coupling lugs 242. The plurality of coupling blocks 241 are disposed along the opening 238. The plurality of coupling lugs 242 corresponds to the plurality of coupling blocks 241 and are arranged at a a periphery of the second sub-shell 236. The plurality of coupling lugs 242 are configured to be assembled with the plurality of coupling blocks 241.

Figure 6:
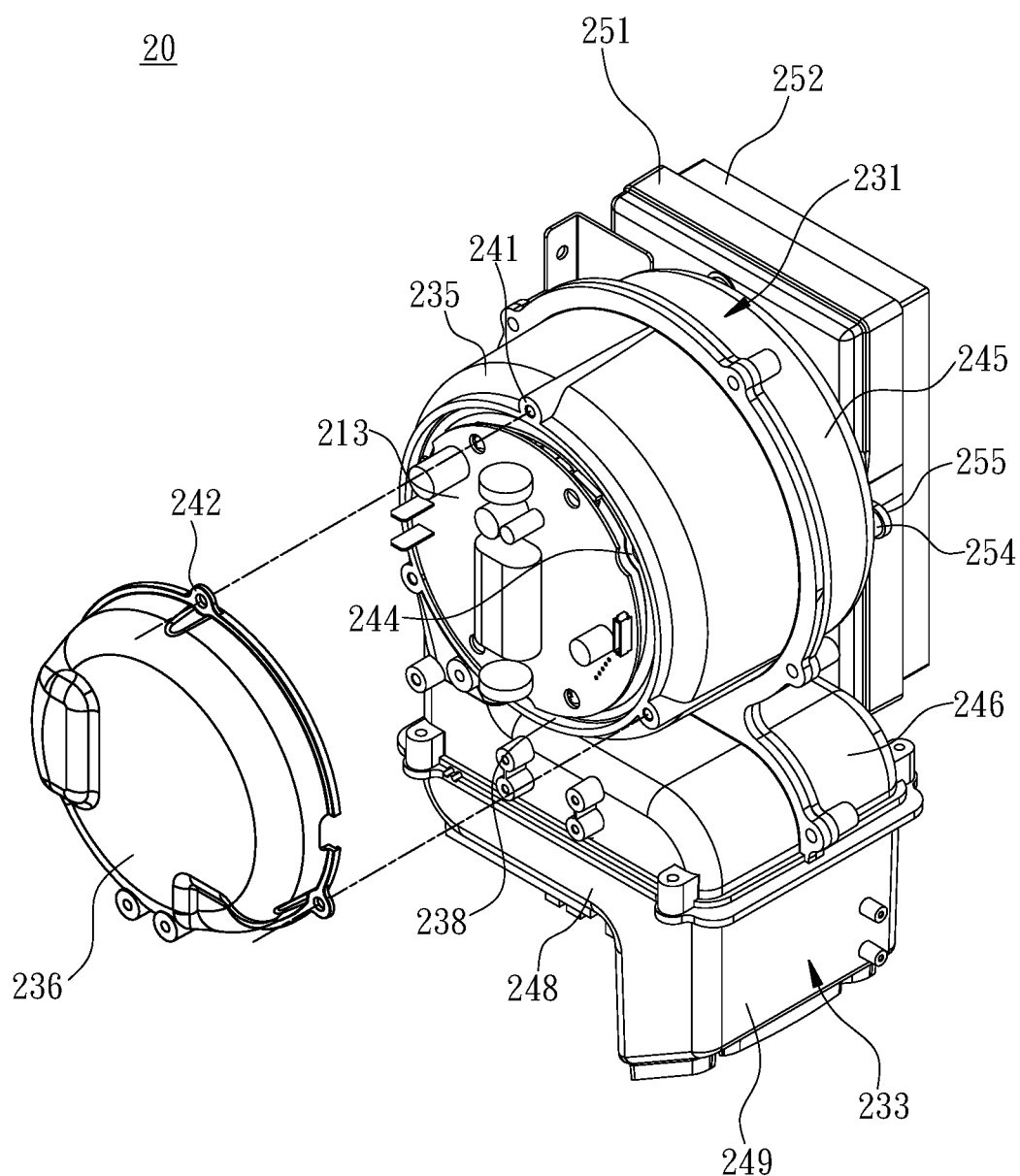
FIG. 6 is a partial exploded view of a second sub-shell according to the embodiment of the invention.

With reference back to FIG. 1, FIG. 2, FIG. 3, and FIG. 4, the configuration between the blower housing 23 and the air flow generation module 21 is described in detail. According to the assembly of the blower 20 of a hand dryer, the air flow generation module 21 is arranged at the side of the first half shell 231, and the air intake 234 faces the air inlet 215. Thereafter, the first sub-shell 235 is assembled with the first half shell 231. The opening 238 is provided for installing the air flow generation module 21 therethrough and exposing the control circuit board 213 outside of the first sub-shell 235, and finally, the second sub-shell 236 is mounted on the opening 238. In one embodiment, one end of the electric motor 212 is connected to the opening 238. Further, the second half shell 232 is of a detachable structure, and the second sub-shell 236 is capable of being separated with the first sub-shell 235. With reference to FIG. 6, the second sub-shell 236 of the blower 20 of a hand dryer is separated from the first sub-shell 235 so that the control circuit board 213 is exposed and replaceable without changing other configurations on the blower 20 of a hand dryer. In the blower 20 of a hand dryer of the invention, the control circuit board 213 is replaced by particularly disassembling the second sub-shell 236, so as to solve the problem of a cumbersome process replacing a control circuit board in a conventional hand dyer.

Figure 2:
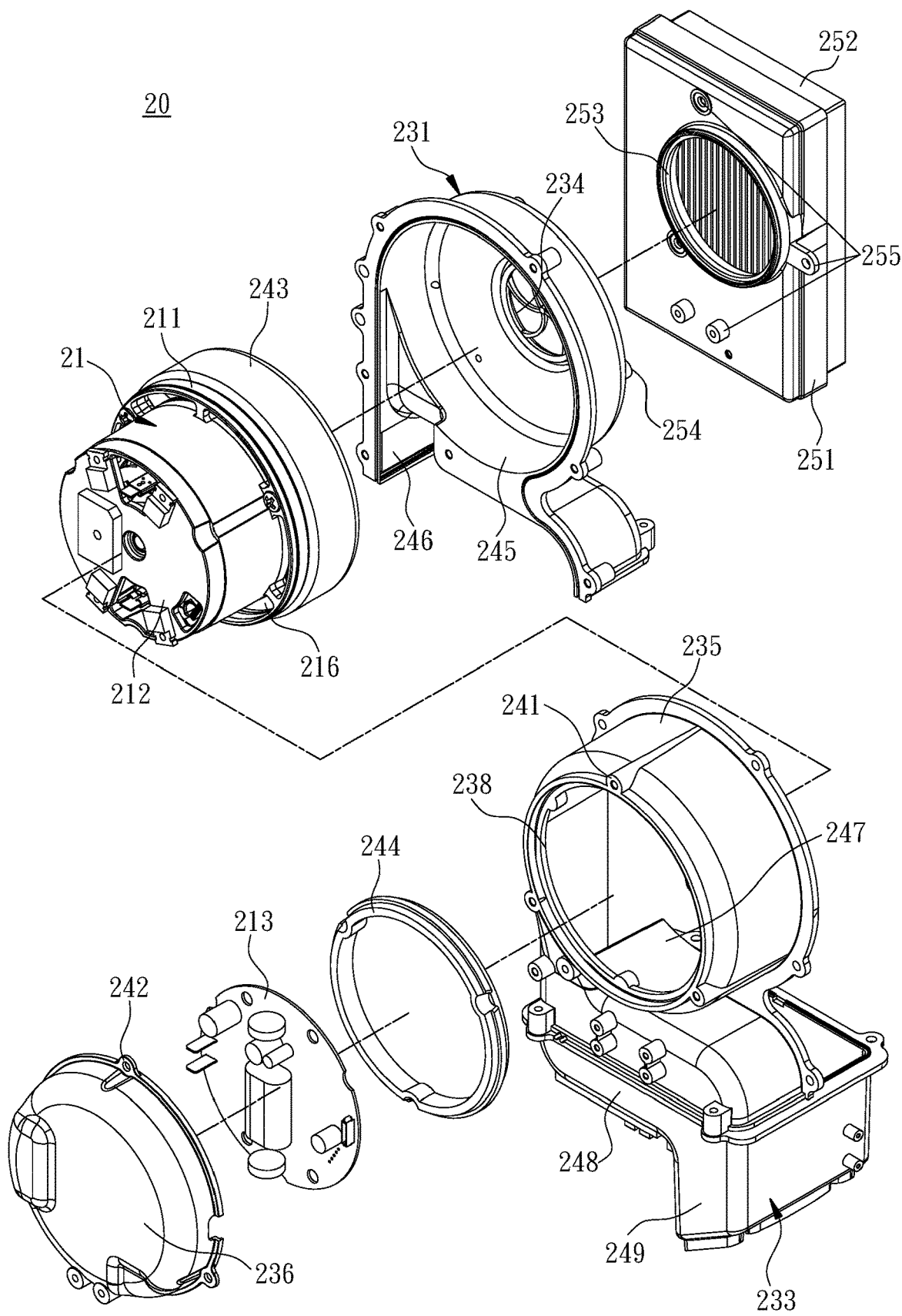
FIG. 2 is a first exploded perspective view of the blower of the hand dryer according to the embodiment of the invention.
Figure 3:
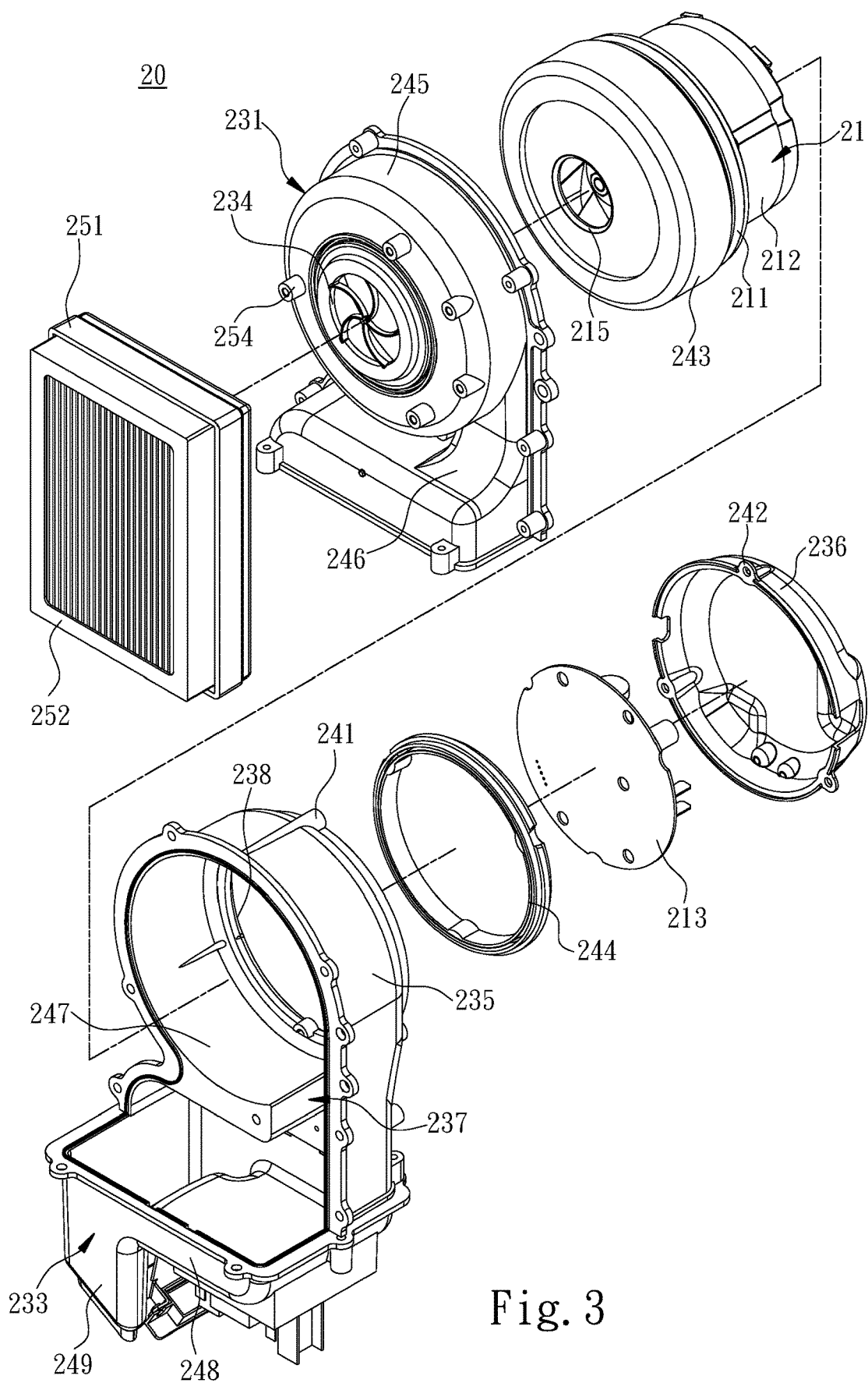
FIG. 3 is a second exploded perspective view of the blower of the hand dryer according to the embodiment of the invention.
Figure 4:
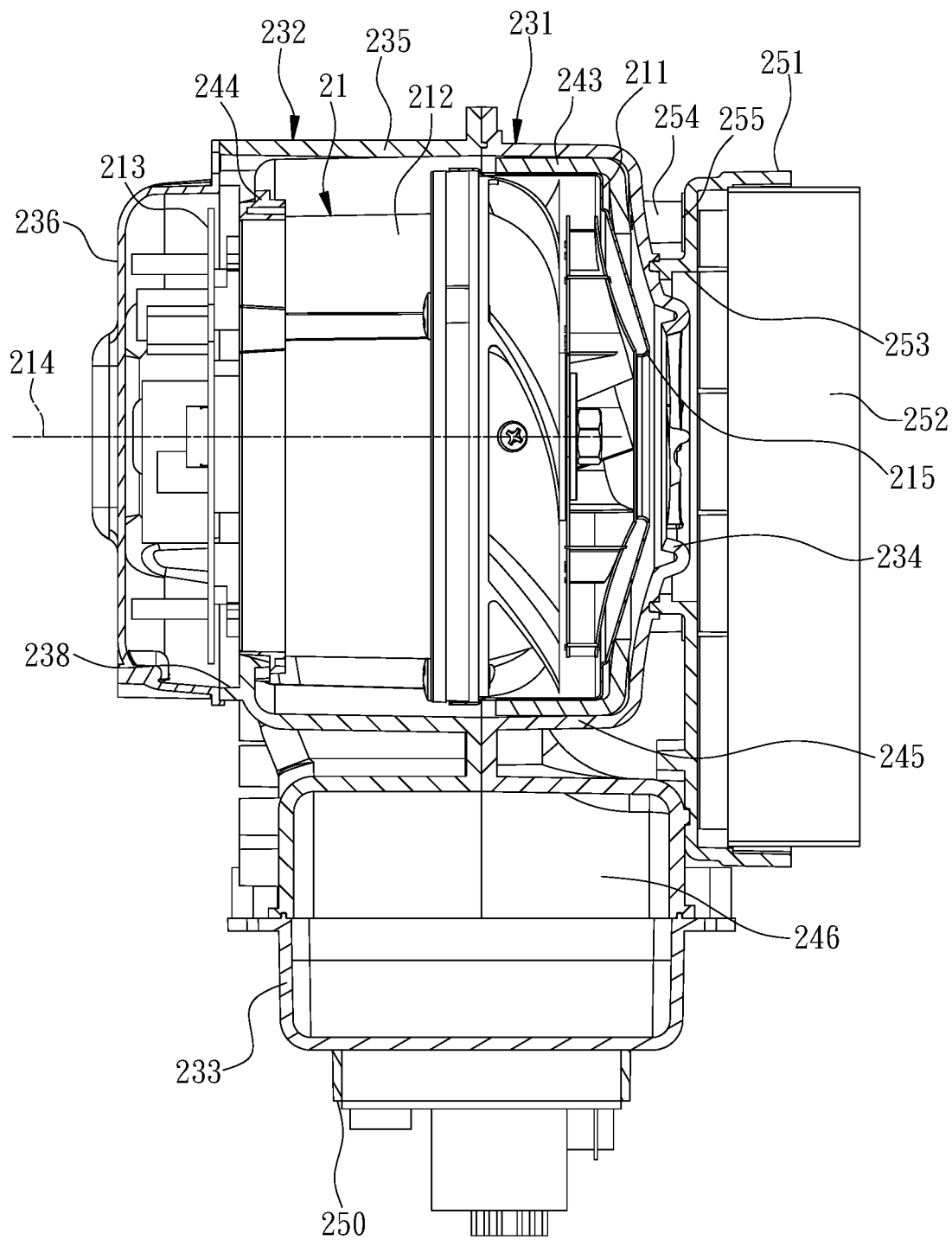
FIG. 4 is a cross-sectional view of the blower of the hand dryer according to the embodiment of the invention.
Figure 5:
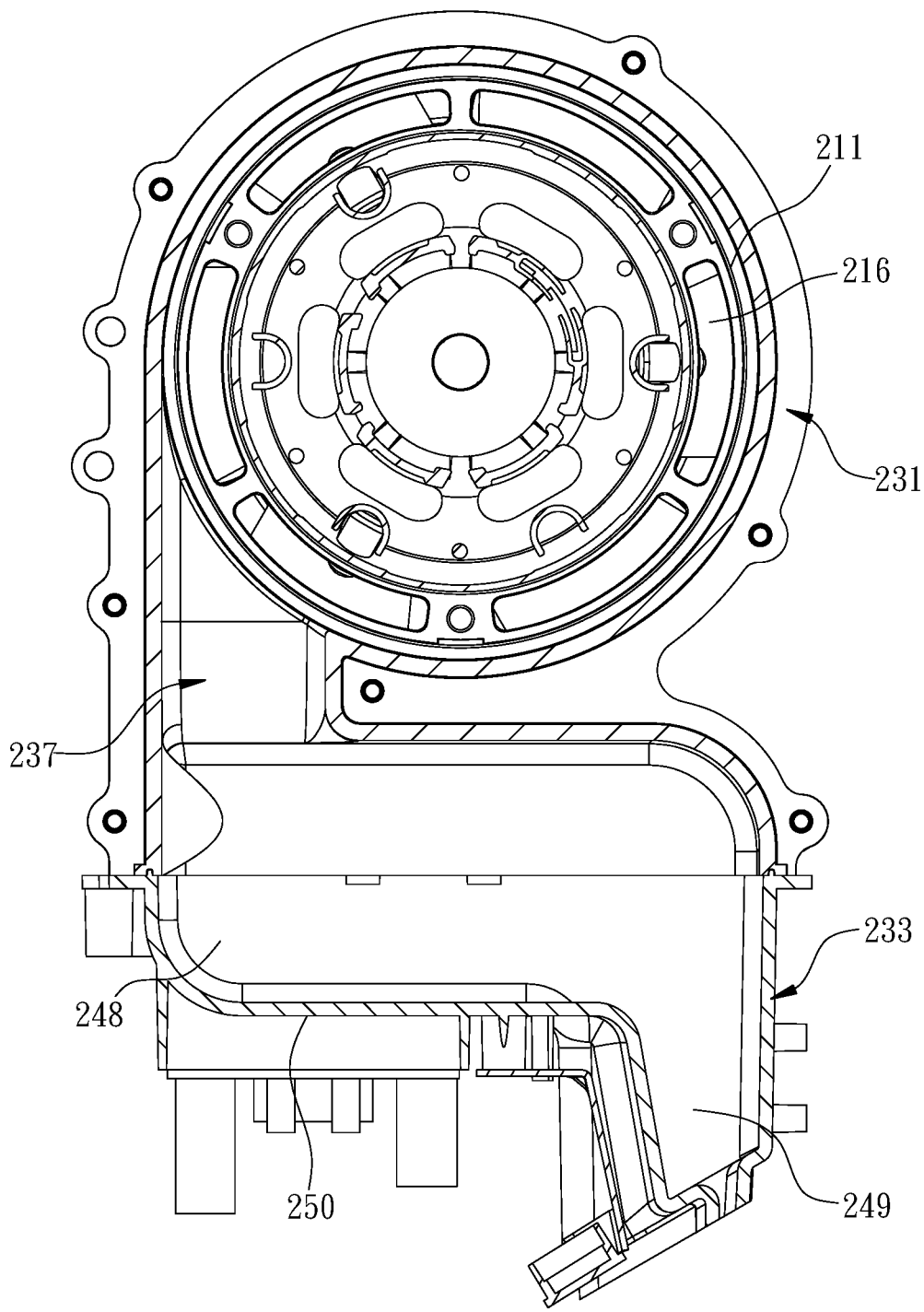
FIG. 5 is another cross-sectional view of the blower of the hand dryer according to the embodiment of the invention.

With reference to FIG. 2, FIG. 3, and FIG. 4, it should be noted that the air case 211 is arranged in the first half shell 231, and the first half shell 231 supports the air flow generation module 21. In one embodiment, a first collar 243 disposed inside the first half shell 231 is sleeved outside the air case 211, i.e. the first collar 243 is located between the air case 211 and the first half shell 231. In one embodiment, the first collar 243 is made of rubber to stabilize the first half shell 231 and to support the implementation of the air flow generation module 21. A second collar 244 disposed inside the first sub-shell 235 is sleeved outside the electric motor 212, namely, the second collar 244 is located between the electric motor 212 and the first sub-shell 235. In one embodiment, the second collar 244 is made of rubber to stabilize the first sub-shell 235 and to support the implementation of the air flow generation module 21.

In one embodiment, the first half shell 231 includes a receiving portion 245 and an air guiding portion 246. The receiving portion 245 is provided for the air case 211 to be disposed therein. The receiving portion 245 tangentially extends to form the air guiding portion 246. The air guiding portion 246 communicates with the ventilation space 237 and the air guiding cover 233. Further, in one embodiment, the first sub-shell 235 includes a restriction rib 247 disposed in the ventilation space 237.

With reference to FIG. 2, FIG. 3, FIG. 4 and FIG. 5, in one embodiment, the air guiding cover 233 includes a connection base 248 and an air outlet portion 249. The connection base 248 connects the first half shell 231 and the second half shell 232. The connection base 248 communicates with the ventilation space 237. The air outlet portion 249 extends from an end of the connection base 248. Further, an outer surface of the connection base 248 opposite to the first half shell 231 and the second half shell 232, is an operating circuit board mounting surface 250. Configuration of circuit mounted on the operating circuit board mounting surface 250 of the blower 20 of a hand dryer of the invention is not changed when removing the second sub-shell 236 to replace the control circuit board 213.

With reference to FIG. 2 and FIG. 4, in one embodiment, the first half shell 231 includes an air filter mounting frame 251 provided with an air filter 252 thereon. The air filter mounting frame 251 includes an air hole 253 located between the air filter 252 and the air intake 234, and the air hole 253 communicates with the air intake 234. Whole of the air intake 234 is located in the air filter mounting frame 251. Further, the air filter mounting frame 251 is a component separable from the first half shell 231. The first half shell 231 includes a plurality of coupling posts 254 provided on a side of the first half shell 231 provided with the air filter mounting frame 251, which is the side of the first half shell 231 facing the air filter mounting frame 251. The air filter mounting frame 251 comprises a plurality of coupling structures 255. Each of the plurality of coupling structures 255 corresponds to one of the plurality of coupling posts 254. The plurality of coupling structures 255 is assembled with the plurality of coupling posts 254. The plurality of coupling structures 255 is selected from a group consisting of a hole, a connecting piece and a protruding post.

Figure 7:
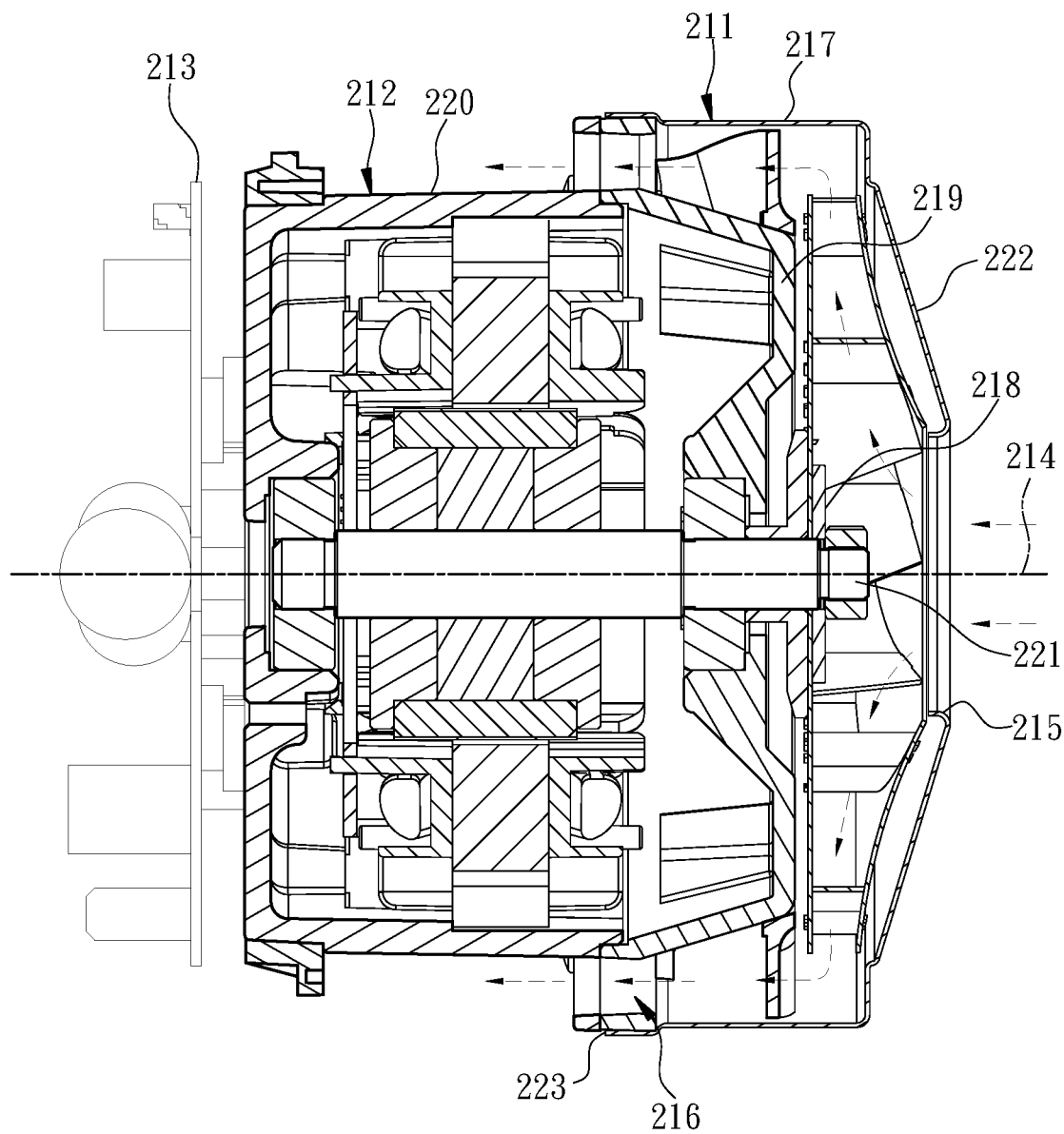
FIG. 7 is a cross-sectional view of an air flow generation module according to the embodiment of the invention.

With reference to FIG. 7, the air case 211 of the invention includes a tub 217 connected to a motor housing 220 of the electric motor 212 and positioned at one side of the electric motor 212, a rotatable fan blade 218 positioned in the tub 217 and connected with a driving shaft 221 of the electric motor 212, and a baffle 219. The rotatable fan blade 218 is rotated and driven by the driving shaft 221 to generate an airflow. The baffle 219 is positioned within the tub 217 and fixed to the motor housing 220. The baffle 219 is provided to receive the airflow and direct the airflow in a direction toward the electric motor 212. Further, the tub 217 includes a tub bottom 222 and a tub opening 223. The tub bottom 222 is provided at a side of the tub 217 opposite to the electric motor 212. The tub opening 223 is provided at a side of the tub 217 facing the electric motor 212. The tub bottom 222 is formed with the air inlet 215. The tub opening 223 and the motor housing 220 define the air outlet gap 216.

What is claimed is:

1. A blower of a hand dryer, comprising:
   an air flow generation module, which is an integrated structure, comprising an air case, an electric motor and a control circuit board, the air case, the electric motor and the control circuit board being sequentially arranged along an extension line, the air case comprising an air inlet located on the extension line and an air outlet gap defined by the electric motor and the air case; and
   a blower housing, comprising a first half shell, a second half shell assembled with the first half shell, and an air guiding cover assembled with the first half shell and the second half shell, the air flow generation module being provided in the first half shell and the second half shell, the first half shell comprising an air intake facing the air inlet, the second half shell comprising a first sub-shell assembled with the first half shell and a second sub-shell capable of being separated with the first sub-shell, the first sub-shell forming a ventilation space communicating the air outlet gap with the air guiding cover, the first sub-shell comprising an opening, wherein the opening is provided for installing the air flow generation module therethrough and exposing the control circuit board outside of the first sub-shell, the second sub-shell is mounted on the opening, and the control circuit board is exposed and replaceable when the second sub-shell separated with the first sub-shell.

2. The blower of a hand dryer as claimed in claim 1, wherein the first half shell comprises an air filter mounting frame, and whole of the air intake is located in the air filter mounting frame.

3. The blower of a hand dryer as claimed in claim 2, wherein the air filter mounting frame is a component separable from the first half shell, the first half shell comprises a plurality of coupling posts facing the air filter mounting frame, the air filter mounting frame comprises a plurality of coupling structures assembled with the plurality of coupling posts, each of the plurality of coupling structures is selected from a group consisting of a hole, a connecting piece and a protruding post.

4. The blower of a hand dryer as claimed in claim 1, wherein one end of the electric motor is connected to the opening.

5. The blower of a hand dryer as claimed in claim 4, wherein the blower housing comprises a first collar disposed inside the first half shell and sleeved outside the air case.

6. The blower of a hand dryer as claimed in claim 5, wherein the blower housing comprises a second collar disposed inside the first sub-shell and sleeved outside the electric motor.

7. The blower of a hand dryer as claimed in claim 4, wherein the first sub-shell comprises a plurality of coupling blocks arranged along the opening, and the second sub-shell comprises a plurality of coupling lugs arranged at a periphery and assembled with the plurality of coupling blocks.

8. The blower of a hand dryer as claimed in claim 4, wherein the first half shell comprises a receiving portion in which the air case is provided and an air guiding portion communicating with the ventilation space, and the receiving portion tangentially extends to form the air guiding portion.

9. The blower of a hand dryer as claimed in claim 8, wherein the first sub-shell comprises a restriction rib provided in the ventilation space.

10. The blower of a hand dryer as claimed in claim 1, wherein the first half shell comprises a receiving portion in which the air case is provided and an air guiding portion communicating with the ventilation space, and the receiving portion tangentially extends to form the air guiding portion.

11. The blower of a hand dryer as claimed in claim 10, wherein the first sub-shell comprises a restriction rib provided in the ventilation space.

12. The blower of a hand dryer as claimed in claim 1, wherein the air guiding cover comprises a connection base and an air outlet portion, the connection base connects the first half shell and the second half shell, the air outlet portion extends from one end of the connection base, and an outer surface of the connection base opposite to the first half shell and the second half shell is an operating circuit board mounting surface.

* * * * *